Sept. 14, 1965
B. A. NAGLER
3,206,145
HELICOPTER WITH SHROUDED OR DUCTED ROTOR
Filed Oct. 30, 1961
2 Sheets-Sheet 1
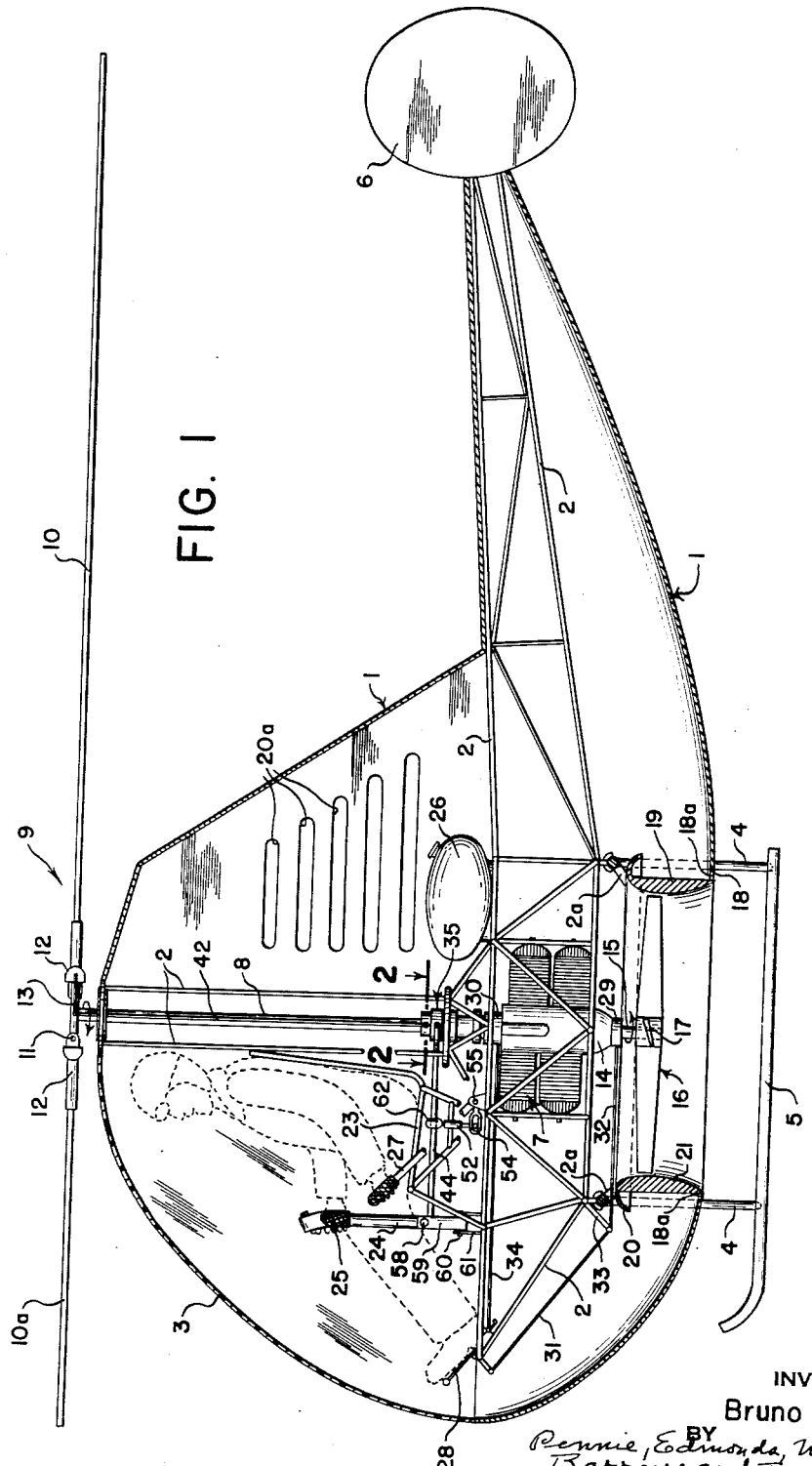
FIG. I
INVENTOR
Bruno A. Nagler
BY
Rennie, Edmonds, Morton,
Barrows and Taylor
HIS ATTORNEYS Sept. 14, 1965          B. A. NAGLER          3,206,145
HELICOPTER WITH SHROUDED OR DUCTED ROTOR
Filed Oct. 30, 1961          2 Sheets-Sheet 2
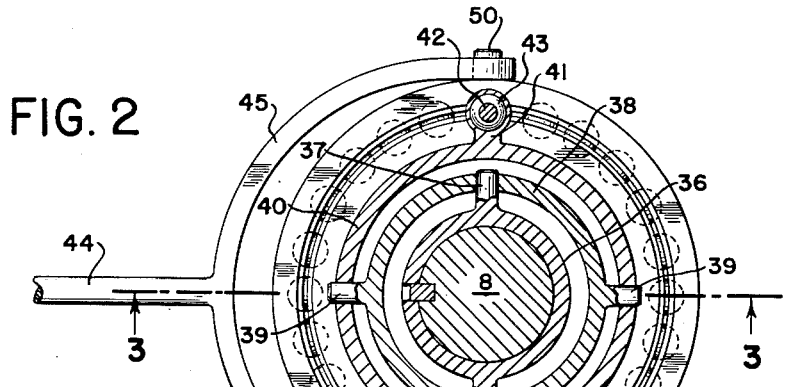
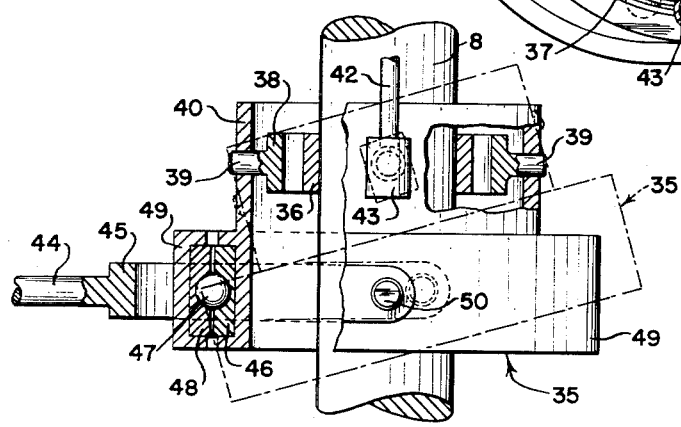
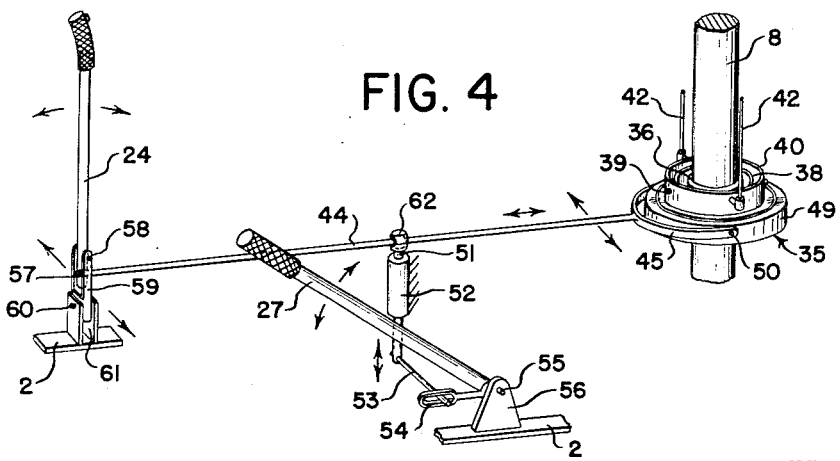
INVENTOR
Bruno A. Nagler
BY Pennie, Edmonds, Morton, Barrows and Taylor
HIS ATTORNEYS

United States Patent Office 3,206,145
Patented Sept. 14, 1965

3,206,145
HELICOPTER WITH SHROUDED OR DUCTED ROTOR
Bruno A. Nagler, Hotel Webster, 40 W. 45th St., New York, N.Y.
Filed Oct. 30, 1961, Ser. No. 149,488
1 Claim. (Cl. 244—17.23)

This invention relates to aircraft of the rotating wing type and especially to a craft of this type having counter rotating blades or rotors.

This is a continuing application of my earlier application for United States Letters Patent Serial No. 583,510, filed May 8, 1956, now abandoned.

It is well understood that two of the disadvantages of rotary wing aircraft have been, first, the necessity of overcoming the torque of the engine which tends to cause the aircraft to rotate, and secondly, its speed limitations. In the conventional helicopter, it is customary to balance the engine torque by means of a laterally directed propeller mounted in the tail portion of the aircraft.

Various attempts have been made to solve the second problem, namely, that of limited air speed. For example, it has been proposed to use Convertaplanes, or small wings attached to the fuselage or the suspension rig of the aircraft, to provide part of the lift and thus allow the machine to attain a higher air speed. Such additional wings have proved objectionable, however, for one reason or another, and the use of the propeller for torque balance is objectionable because it consumes a part of the engine power without providing lift, increases the weight of the aircraft, and for other reasons.

When a rotary wing aircraft is in flight, the advancing blade of the rotor and the retreating blade behave very differently. The air speed of the advancing blade is equal to the air speed of the aircraft plus the speed due to rotation, whereas the air speed of the one retreating is equal to the air speed of the ship minus the speed due to rotation. The retreating blade is moving with the wind and, therefore, as the speed of the aircraft increases, the velocity of the blade with respect to the air becomes less and less.

In order to cause this blade to produce its share of the lift, the pitch or angle of attack is increased. Consequently, as the speed of the ship is increased, a point is reached where the rotor blade commences to stall. When an airfoil stalls, it loses lift, and this loss of lift, during a portion of the rotation of each of the helicopter blades, produces vibration. Such vibration can become destructive if it is allowed to continue, and thus causes the limitation in forward speed of conventional rotating wing aircraft.

In particular applications it is desirable to maintain rotary wing type craft in a stationary position in space, or to provide a mechanism for lifting objects in a vertical direction. However, it has generally been difficult to achieve the necessary degree of stability.

A primary object of the present invention is to provide an aircraft of the rotating wing type which is capable of higher air speeds in forward flight than have heretofore been achieved, and which provides a mechanism capable of maintaining a stable position in space and which can lift objects vertically. In accordance with the invention, upper and lower rotors rotating coaxially in opposite directions are employed, the lower rotor being smaller in diameter than the upper. The upper rotor is provided with means for controlling both cyclic and collective pitch, and, advantageously, the blades of the lower rotor are fixed, and, furthermore, an air duct structure, or shroud, is arranged to closely surround this lower rotor, the inlet to the air duct structure being a short distance above the rotor and the outlet a short distance below.

Means comprising an engine, or motive power of any convenient sort, is arranged to drive the upper and lower rotors simultaneously in opposite directions, the engine housing being mounted in the aircraft frame to rotate freely, and being connected to drive one of the rotors, while the engine crank shaft, or other output shaft is connected to drive the other rotor. The upper rotor will ordinarily be of much larger diameter than the lower, and the rotative speeds of the two rotors will be considerably different. However, the torques of the two rotors will be equal, and since both the engine housing and crankshaft rotate, no tendency to rotate the aircraft will be present.

The duct structure, or shroud, surrounding the lower rotor greatly increases the lift of the rotor so that as much as two-thirds of the total lift required can be produced by this fixed pitch rotor, leaving only about one-third to be produced by the upper or variable pitch rotor. Thus, the upper rotor can be operated at higher rotative speeds and its blades set at smaller angles of attack, resulting in greater aircraft speed without encountering stalling and vibration. In addition, the upper rotor blade setting may be controlled automatically to maintain a desired stationary position in space.

The advantages of the invention for the purpose of providing a stabilized platform and vertical lifting device can be obtained without a fuselage and with the duct section or shroud exposed or open to the outside air. In order to obtain the best advantages for use in forward flight conditions, however, the duct should be within the aircraft fuselage and the air supply should be so arranged that the air will flow axially into the duct and to the lower rotor. When the duct, or shroud, is exposed, considerable eddying is produced, at the customary tilt or flying angle of the air craft, at both the leading and trailing edges of the duct inlet. Such eddies both cause noise and create drag, and are generally undesirable. However, by drawing in the air for the duct through openings in the sides of the fuselage, the air can be fed axially and quietly to the duct inlet, the interior of the fuselage becoming a plenum or tranquilizing chamber.

The invention will be more fully understood and other objects and advantages will become apparent from the following description and accompanying drawings.

In these drawings:

FIG. 1 is a view in central, vertical section through the aircraft;

FIGS. 2, 3 and 4 are views showing the details of the control mechanism; FIG. 2 being a transverse sectional view taken on line 2—2 of FIG. 1; FIG. 3 a view partly in vertical section taken on line 3—3 of FIG. 2, and FIG. 4 is a diagrammatic perspective.

The aircraft shown in FIG. 1, comprises a fuselage or body 1 made, for example, of sheet metal and enclosing the supporting frame structure or suspension rig 2 on all sides. Forward of the pilot's position, the fuselage includes a section 3 of transparent material such, for example, as a suitable plastic. The framework 2 is supported upon four vertical posts 4 at the bottom that terminate in a pair of skids 5 which may, of course, be replaced by wheels, if desired. Frame portion 2 has a rear extension, as shown, at the end of which is mounted a tail fin 6, to aid in directional control, particularly during autorotation.

The aircraft engine is indicated at 7, and a vertical shaft 8, extending upwardly from the engine housing, projects above the top of the fuselage 1 and has suitable bearings carried by the air frame 2. A rotor assembly, indicated generally by reference numeral 9, is mounted on the upper end of shaft 8. This rotor assembly comprises at least two blades 10 and 10a of airfoil cross-section. The mounting of these blades is conventional, each blade having a flapping hinge 11 and each blade being longitudinally pivoted to permit feathering.

To this end each blade has a shank 12 which forms the outer member of the longitudinal or feathering pivot. The pitch of each blade can be varied by means of an arm 13 which is fixed to, and preferably formed integrally with, each of the shanks 12, and projects laterally and angularly therefrom so that the inner ends of these two arms are located approximately opposite the center of shaft 8 to facilitate connection with the control mechanism, which will be described later.

The housing 14 of the aircraft engine 7, that is to say, the engine itself, is mounted to turn in bearings (not shown) which are carried by the frame 2 of the aircraft. Upper rotor assembly 9 is driven by the engine housing 14 which is operatively connected to the lower end of shaft 8. The engine crank shaft 15 drives the lower rotor 16. Shaft 15 projects from the lower end of housing 14 and the hub of the fixed pitch rotor 16 is mounted on the lower end of this shaft but at a position above the level of the underbody or lower surface of fuselage 1. Rotor 16 is shown as having four blades and each of them is constructed with an airfoil cross-section, as indicated at 17.

Concentric with shafts 8 and 15, the underbody of the fuselage 1 has a circular opening 18 and mounted around the periphery of this opening there is a duct or shroud 19. This member projects upwardly above the lower rotor 16 and is generally of airfoil cross-section and provided with an outwardly turned or spun lip 20 forming the inlet to the duct for the purpose of causing the air within the fuselage to flow axially into the duct. The lip and airfoil shape of duct 19 cause air circulation along the surface which aids the propeller blades in providing lift. The lower edge of shroud 19 is advantageously spaced from the periphery of fuselage opening 18 leaving an annular space 18a so that air flow may take place upwardly and mingle with the air entering the top of the duct. Struts 2a connect duct 19 with the airframe 2 for support.

In order to enable the interior of the fuselage 1 to serve as a plenum chamber and tranquilize the air so it may flow axially into the duct inlet 20, the side walls of the fuselage are provided with openings 20a, preferably in the form of louvers, which are arranged to permit an ample supply of air to be drawn into the interior of the fuselage when the aircraft is in operation.

At the operator's position, there is provided a seat 23 and nearby there are the usual control levers. The upright lever 24 provides directional control of the aircraft in forward flight through a mechanism which cyclicly feathers the upper rotor blades 10 and 10a. The handle 25 of this lever may be rotated to control the throttle of engine 7, which receives its fuel from a fuel tank 26. A lever 27, which is inclined at one side of the operator's position 23, controls the lift or rate of climb through controlling the collective pitch of the upper rotor blades 10 and 10a.

Directional control of the aircraft during hovering is by right and left foot levers 28, only one of which is shown. One of these levers operates a friction brake 29 between the aircraft frame and the engine crank shaft 15 and the other foot lever controls a friction brake 30 between the frame 2 and the upper rotor shaft 8. Since these two members rotate in opposite directions, the two foot levers can be manipulated to control the swing or yaw of the aircraft, either to the right or left.

Foot lever 28 is connected to operate lower brake 29 through links 31 and 32, and a pivoted arm 33. The opposite foot lever 28 is connected to operate the upper brake 30 through a single link 34. Brake 29 is used also to lock the engine housing during starting of the engine.

Ordinarily the lower, or fixed pitch, rotor 16 will rotate in the counterclockwise direction, and the upper rotor with blades 10 and 10a, will rotate clockwise. The lower rotor is smaller in diameter than the upper, a convenient ratio being about 6 to 1, but the lower will operate at a considerably higher rotative speed. The required condition is that each rotor absorb the same torque.

The cyclic pitch and collective pitch controlling mechanisms for the upper rotor are shown diagrammatically in FIG. 1, and in greater detail in FIGS. 2, 3 and 4. Referring to those figures, a swash plate structure is indicated generally by numeral 35. This comprises a sleeve 36 which is arranged to slide vertically on shaft 8 and may be connected to rotate therewith by means of a slidable key, as indicated in FIG. 2. Inner gimbal bearings 37 are formed by trunnions which project into diametrically opposite apertures in outer ring 38. Outer ring member 38, in turn, is provided with gimbal bearings 39 at right angles to bearings 37 and formed by trunnions projecting into apertures arranged diametrically opposite one another in a hollow cylindrical member 40.

Cyclinder 40 constitutes a swash plate and, accordingly, is appropriately connected with respective turning arms 13 of the upper rotor blades 10 and 10a, so as to feather these blades cyclically as they rotate. For this purpose, the hollow cylinder 40 is provided with two lateral projections 41 which are diametrically opposite one another and also in axial alignment with the inner gimbal bearings 37. A pair of vertical rods 42 are disposed on opposite sides of the power shaft 8 and connected by means of ball and socket joints 43 with the respective lateral projections 41. The upper ends of rods 42 are connected to the respective arms 13 by similar universal connections. It will be understood that the collective pitch, that is, the simultaneous change in the pitch of rotor blades 10 and 10a, can be accomplished by moving the swash plate mechanism 35 vertically on shaft 8.

In order to produce the tilting and vertical movements of swash plate mechanism 35, the control mechanism, shown in FIGS. 1 and 4, is provided, which includes the cyclic pitch control lever 24 and the collective pitch control lever 27. To operatively connect these two levers with wash plate mechanism 35, a substantially rigid bar 44, having a forked portion 45, at its right end, is used. The hollow cylindrical member 40 extends some distance (several inches) below the plane of the gimbal bearings 37 and 39, and carries at its lower periphery an inner ball race 46 of a ball bearing 47. The outer ball race 48 is mounted in a ring member 49 having projections 50 diametrically opposite one another, and the forked end 45 of bar 44 is pivoted to these projections.

In order that cyclic pitch lever 24 and collective pitch lever 27 may function, they are associated with bar 44 in the following manner. Bar 44 is supported intermediate its ends on the upper end of a vertically movable rod 51, which slides in a stationary guide 52 fixed to the frame 2 of the aircraft. Fixed to and projecting laterally from the lower end of rod 51 is a rod 53 which is engaged by a slotted arm 54 that is fixed to the lower end of collective pitch lever 27. This lever is pivoted at 55 in a suitable bracket 56 which is attached to a part of the aircraft frame 2.

Thus, when lever 27 is moved in either direction, as shown by the arrows in FIG. 4, it will cause a vertical shifting of rod 51 in guide sleeve 52 thereby raising or lowering the forked end 45 of bar 44, and imparting a bodily shifting movement to swash plate mechanism 35 upwardly or downwardly on shaft 8 to change the collective pitch of rotor blades 10 and 10a. The left end of bar 44 is connected by means of a universal joint 57 to the lower end of cyclic control lever 24, and during the vertical movement of bar 44 by collective pitch lever 27, this bar pivots about such joint.

The cyclic pitch control lever 24 is pivoted to be swung in two directions, that is to say, it can swing forward and aft, as indicated by the arrows in FIG. 4, about a pivot 58 at the top of an upwardly projecting forked support 59. Lever 24 can also swing laterally in either direction, as indicated by the arrows and, in so doing, the forked support 59 turns about a pivot 60 on a bracket 61, also mounted on the frame 2 of the aircraft.

In order that bar 44 may be moved longitudinally and also be swung sidewise by lever 24, the bar is mounted at the top of rod 51 by means of a universal connection 62. This connection comprises a ball member which is not clearly visible but which is mounted within a socket fixed to the top of rod 51. Bar 44 passes through an aperture in the ball member with a sliding fit. It will, therefore, be understood that when cyclic pitch control lever 24 is pushed toward the left, for example, its lower end will move toward the right, as viewed in FIG. 4, and this will cause bar 44 to slide in connection 62 and swing or tilt the swash plate mechanism 35 towards the dotted position shown in FIG. 3.

This will produce a cyclic control of the blades 10 and 10a such that the aircraft will tend to move in a forward direction. Should lever 24 be swung sidewise in either direction, it will turn about pivot 60, and bar 44, pivoting on connection 62 and will cause swash plate mechanism 35 to tilt laterally in a direction opposite to the movement of lever 24. Thus, by combined movements the mechanism can be tilted in any direction, and full control of the directional movement of the aircraft in any direction is obtained.

In a rotary wing aircraft, if the angle of attack of the rotor blades is more than about 8° and the rotor speed becomes too high, the stalling point will be reached and dangerous vibration may result. A speed somewhat below the point at which this occurs is the maximum speed at which the aircraft should be operated. With the aircraft of the present invention, since about two-thirds of the lift is provided by the shrouded lower, or fixed pitch rotor, very much higher aircraft speeds may be reached without stalling. Moreover, it is not necessary to adjust the pitch of the blades of the upper rotor to an angle of attack greater than about 8°, even at take-off.

What is claimed is:

In an aircraft of the rotary wing type having a fuselage, upper and lower oppositely rotatable coaxial members, said upper member projecting upwardly from the fuselage and said lower member projecting downwardly within the lower part of the fuselage, a rotor assembly comprising at least two blades of airfoil cross-section hingedly mounted upon said upper rotatable member, a rotor having at least two blades of airfoil cross-section mounted upon said lower rotatable member, an air duct structure closely surrounding said rotor mounted so as to leave an annular opening between its lower edge and the fuselage, said duct having an inlet above said rotor and a discharge opening in the lower surface of the fuselage, pitch control means for controlling cyclic and collective pitch of said rotor assembly, and means for rotating said lower rotor and said upper rotor assembly in opposite directions.

References Cited by the Examiner

UNITED STATES PATENTS

| 2,630,184 | 3/53 | Seibel | 170—160.25 |
| 2,873,075 | 2/59 | Mooers | 244—17.13 |
| 2,969,937 | 1/61 | Trojahn | 244—23 |
| 2,980,365 | 4/61 | Yohe | 244—23 |

FOREIGN PATENTS

| 418,119 | 9/10 | France. |
| 908,252 | 8/45 | France. |
| 449,741 | 7/48 | Canada. |

FERGUS S. MIDDLETON, *Primary Examiner.*

MILTON BUCHLER, *Examiner.*